United States Patent [19]

Taylor

[11] Patent Number: 4,874,007
[45] Date of Patent: Oct. 17, 1989

[54] RESTRICTOR VALVE FLOW PASSAGE POP-UP WEAR INDICATOR

[76] Inventor: Julian S. Taylor, 8300 S.W. 8, Oklahoma City, Okla. 73128

[21] Appl. No.: 296,114

[22] Filed: Jan. 12, 1989

[51] Int. Cl.$^4$ .............................................. G01M 3/28
[52] U.S. Cl. .................................. 137/312; 137/557; 251/118; 73/40.5 R; 116/272
[58] Field of Search ............... 137/557, 312; 251/118, 251/304; 73/40.5 R; 116/272, DIG. 7

[56] References Cited

U.S. PATENT DOCUMENTS

| | | | |
|---|---|---|---|
| 1,511,516 | 10/1924 | Goodfellow | 116/272 |
| 2,263,840 | 11/1941 | Franck | 116/272 |
| 2,583,835 | 1/1952 | Grassenbach | 116/272 |
| 3,691,981 | 9/1972 | Rao | 116/272 |
| 3,952,691 | 4/1976 | Peltz et al. | 116/272 |
| 4,136,709 | 1/1979 | Rogers et al. | 116/272 X |
| 4,461,316 | 7/1984 | Cove et al. | 251/118 |
| 4,596,377 | 6/1986 | Taylor | 251/304 X |
| 4,735,229 | 4/1988 | Lancaster | 137/557 X |

Primary Examiner—John Rivell

[57] ABSTRACT

In a fluid restrictor valve interposed in a high pressure fluid flow line having a fluid passageway disposed downstream from throttling discs and having a sleeve-like turbulence diffuser nested by the wall forming the fluid outlet passageway, a turbulence diffuser worn out indicator is disposed within a valve wall bore communicating with the periphery of the turbulence diffuser. The indicator includes a piston and rod longitudinally slidable in bores formed in the indicator body. Fluid under pressure against the piston forces the piston rod laterally outward with respect to the wall of the valve for visually indicating a worn out fluid turbulence diffuser.

4 Claims, 1 Drawing Sheet

RESTRICTOR VALVE FLOW PASSAGE POP-UP WEAR INDICATOR

BACKGROUND OF THE INVENTION

1. Field of the Invention

The present invention relates to fluid restrictor valves and more particularly to a device visually indicating a worn condition of the valve wall forming the fluid outlet passageway.

In many industries it is necessary to reduce the relatively high pressure and flow rate of fluids through tubular conductors. This is usually accomplished by a restrictor valve interposed in the fluid line which creates a high pressure differential or pressure drop across multiple orifice throttling discs between the inlet and outlet ends of the restrictor valve. Such a valve utilizes a sleeve-type case hardened or carbide coated turbulence diffuser lining the valve outlet passageway adjacent the downstream throttling disc. Erosive jets of high pressure fluids from the throttling discs impacting on the diffuser eventually wears through the diffuser wall and wears the body wall forming the flow passageway to the outlet port.

This invention provides a device for use in combination with such a restrictor valve for alerting maintenance personnel when the diffuser sleeve must be replaced.

2. Description of the Prior Art

I do not know of any patents visually indicating a worn condition of the internal wall surface forming a restrictor valve fluid outlet passageway while the valve is in service with fluid under high pressure flowing therethrough.

SUMMARY OF THE INVENTION

The device comprises a plug-type cylindrical body externally threaded at one end portion for insertion into a cooperating bore formed through a valve body wall communicating with the downstream fluid flow passageway normally having its innerwall surface protected by a fluid jet stream turbulence reducing sleeve. The body is centrally bored and counterbored from its threaded end for receiving a cage covering the head of a piston having a rod end portion opposite the head slidable in the body bore. A lateral bore communicates with the central bore adjacent the outwardly disposed end of the body. A relatively thin disc normally overlies and seals the outward end of the body bore.

The principal object of this invention is to provide a valve flow passageway wall wear indicator which includes a pressure responsive member forced laterally outward from the valve wall outer surface in a visible pop-up action in response to erosive fluid jets destructively wearing away a flow passageway sleeve and beginning wear on the valve flow passage innerwall surfaces so the valve may be taken out of service and maintained thus eliminating material damage to the body of the valve and contaminating the environment.

DESCRIPTION OF THE PREFERRED EMBODIMENTS

Figure 1:
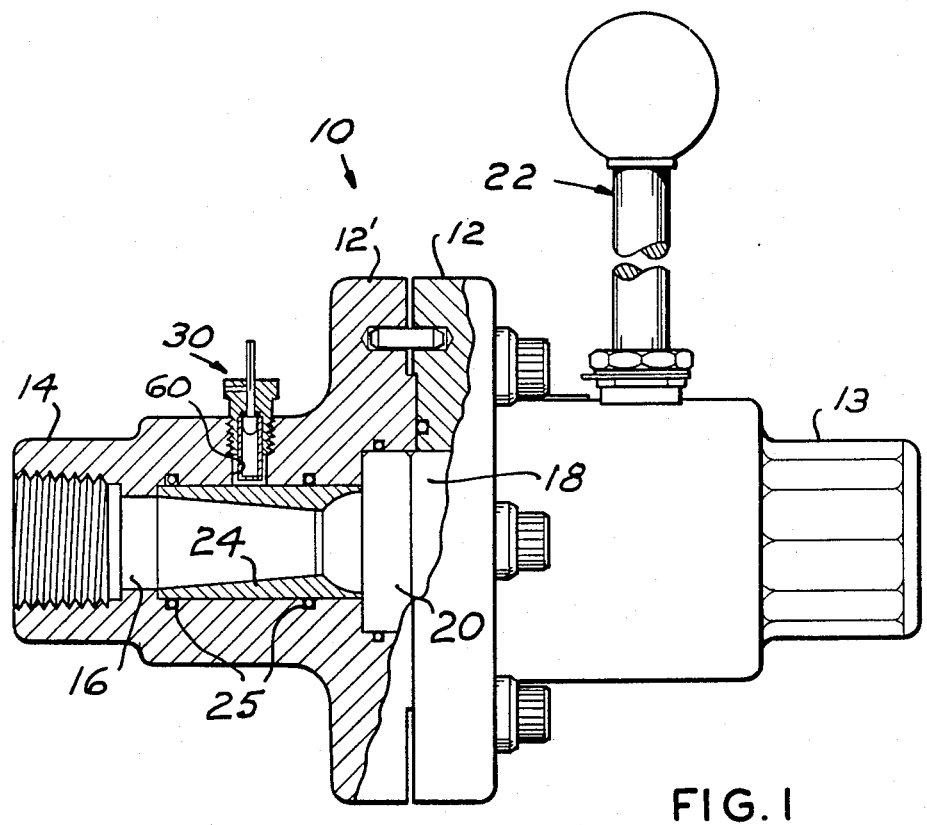
FIG. 1 is a vertical cross sectional view of the device in valve worn indicating position when installed on a restrictor valve.

Like characters of reference designate like parts in those figures of the drawings in which they occur.

In the drawings:

The reference numeral 10 indicates a flow restricting valve having axially joined upstream and downstream body halves 12 and 12', respectively, and having its inlet and outlet ends 13 and 14 and flow passageway 16 axially interposed in a flow line, not shown. Intermediate its ends, the valve passageway 16 is intersected by a pair of multiple orifice throttling discs 18 and 20 generating a pressure drop across the position of the discs when fluid under high pressure flows through the valve. High pressure jet streams, not shown, impact on the valve wall forming the downstream passageway. The valve flow passageway 16 nests a sleeve-type turbulence diffuser 24 formed from or coated with hard metallic abrasive resistant material, such as carbide. Respective peripheral end portions of the diffuser are surrounded by O-rings 25 to isolate the major medial portion of its outer wall surface from fluid under pressure in the flow passageway for the purpose presently apparent. The upstream disc 18 is manually rotated angularly by a laterally projecting handle member 22 connected with the upstream disc for mating or mismating apertures in the discs 18 and 20 in the manner fully disclosed by my U.S. Pat. No. 4,596,377.

The above description forms no part of the present invention other than to set forth the type of restrictor valve with which the present invention is particularly adapted for.

The numeral 30 generally designates the valve wear indicator which is generally cylindrical plug-type in overall configuration comprising a body 32 having a wrench head end portion 34 and external threads 36 at its other end portion. The body 32 is centrally drilled, as at 38, and counterbored, as at 40, from its threaded end for receiving the open end of a tubular cage 42 with the cage projecting beyond the threaded end and defined by an end wall 44 having a central aperture 46. The cage surrounds a piston 48 longitudinally slidable in the cage and having a piston rod 50 slidable in the body bore 38 and substantially coextensive with the axial length of the body 32.

A seal, such as an O-ring 52, is interposed between the inward end of the cage 42 and inward limit of the counterbore 40 for sealing with the periphery of the piston rod 50.

Figures 2, 3, 4:
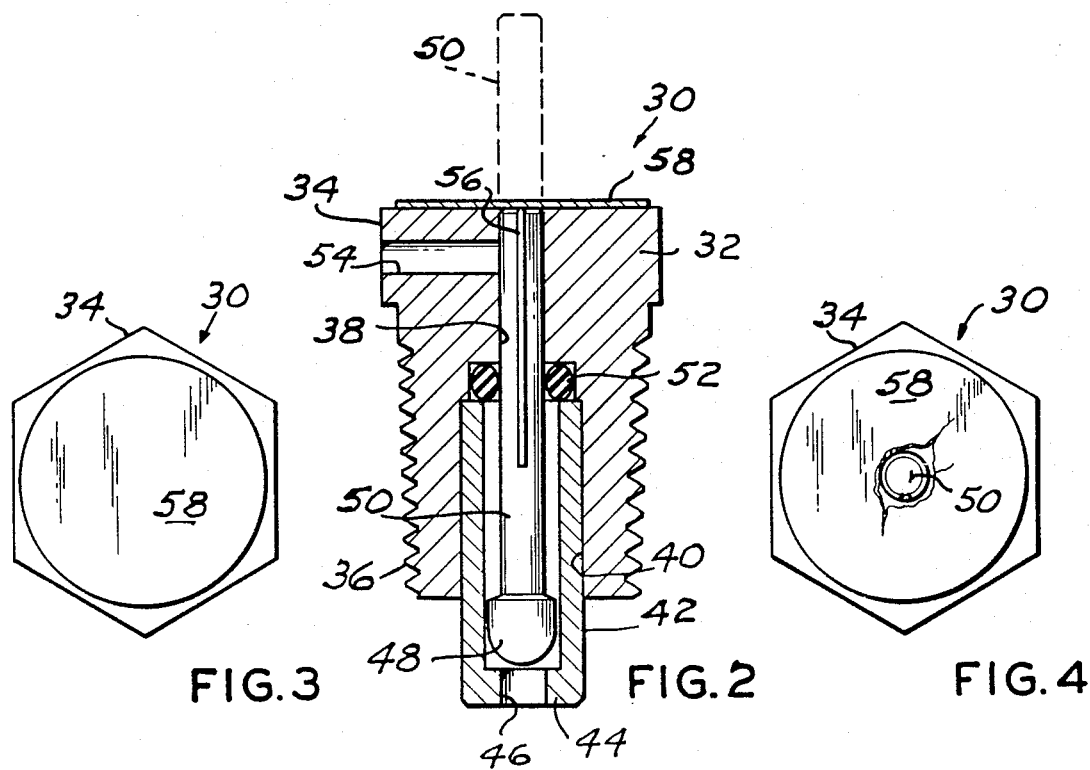
FIG. 2 is a vertical cross sectional view, to a larger scale, of the device in its normal operation position, its valve worn position being indicated by dotted lines.
FIG. 3 is a top view of FIG. 2.
FIG. 4 is a top view of FIG. 2 after the bore closing disc has been ruptured by the wear indicating piston.

The wrench head 34 is provided with a lateral bore 54 communicating with the body bore 38 for the purpose presently explained. Similarly, the piston rod is provided with a longitudinally extending relatively shallow groove 56 formed in its end portion opposite the piston head. The piston and its rod 50 are normally maintained in the solid line position of FIG. 2 by a relatively thin layer of easily broken material, such as a layer of paper 58, which may be a decalcomania or other adhesive coated peel-away label material.

The indicator 30 is mounted on the wall of the downstream body portion 12' by threadedly inserting it into a bore 60 formed or drilled through the body wall intersecting the position of the turbulence diffuser 24 substantially medially its ends and between the position of the O-rings 25. When fully inserted into the valve body wall, the cage end wall 44 is disposed in close spaced relation with respect to the periphery of the turbulence diffuser 24.

Operation

Assuming the wear indicator 30 has been installed in the restrictor valve 10, as described hereinabove, when erosive fluid jets has worn through the wall of the turbulence diffuser 30, at any point between the upstream and downstream O-ring seals 25, fluid under pressure, entering the cage bore 46, forces the piston 48 outwardly so that its piston rod 50 bursts the paper seal 58 and seats the piston against the O-ring seal 52 to prevent further loss of fluid from the valve passageway 16. Any fluid initially entering the cage 42 is released or bled off by the piston groove 56 and lateral bore 54. The outwardly disposed end portion of the piston rod 50, indicated by the dotted lines (FIG. 3) and solid lines in FIG. 1, alerts maintenance personnel that the turbulence diffuser 24 has been worn through and must be replaced. This is accomplished in a conventional manner in which flow through the valve 10 is stopped, the valve removed, dismantled and a new diffuser and O-ring seals 25 installed therein. The wear indicator 30 need not be replaced but may be reset by manually forcing its piston and rod 50 inwardly to its solid line position of FIG. 2, and replacing the paper seal 58 for closing the axial bore 38.

Obviously the invention is susceptible to changes or alterations without defeating its practicability. Therefore, I do not wish to be confined to the preferred embodiment shown in the drawings and described herein.

I claim:

1. In a flow restrictor valve having a turbulence diffuser and flow passageway wall protector in its outlet passageway downstream from flow throttling discs and having a lateral bore communicating with a peripheral portion of the diffuser, the improvement comprising:
   worn diffuser indicating means in the lateral bore including a tubular body having an outward end and having an annular inwardly facing shoulder intermediate the ends of its bore;
   fluid pressure responsive means including a piston having a piston head contained by the inward end portion of said body and including a piston rod projecting toward said end surface axially slidable in said indicating means having a first position normally disposed inwardly of said outer end surface and having a second position projecting outwardly of said outer end surface in response to a worn condition of said turbulence diffuser permitting fluid under greater than atmospheric pressure actuating said pressure responsive means;
   a tubular cage surrounding said piston head and having an inward end adjacent said shoulder; and,
   a seal ring interposed between the inwardly disposed end of said cage and said annular shoulder.

2. The combination according to claim 1 and further including:
   seal means overlying said end surface and normally closing the outward end of the body bore.

3. In a flow restrictor valve having a sleeve-type turbulence diffuser and flow passageway wall protector axially disposed with its end portions sealed fluid tight with the flow passageway wall, said valve having a lateral bore communicating with a peripheral portion of the diffuser between its end sealed positions, the improvement comprising:
   worn diffuser indicating means including a tubular member axially disposed in the lateral bore and having an outwardly disposed end surface;
   the inward end portion of said tubular member having a counterbore defining an inwardly facing annular shoulder intermediate its ends;
   fluid pressure responsive means including a piston having a piston head contained by the counterbore and including a piston rod projecting toward said end surface axially slidable in said indicating means having a first position normally disposed inwardly of said outer end surface and having a second position projecting outwardly of said outer end surface in response to a worn condition between the end sealed positions of said turbulence diffuser permitting fluid under greater than atmospheric pressure to enter the valve lateral bore and actuate said pressure responsive means;
   a tubular cage surrounding said piston head and having an inward end adjacent said shoulder; and, a seal ring interposed between the inwardly disposed end of said cage and said annular shoulder.

4. The combination according to claim 3 and further including:
   seal means overlying said end surface for normally closing the outward end of the tubular member bore.

* * * * *